(12) United States Patent
Kojima et al.

(10) Patent No.: US 7,978,903 B2
(45) Date of Patent: Jul. 12, 2011

(54) DEFECT DETECTING METHOD AND DEFECT DETECTING DEVICE

(75) Inventors: Koichi Kojima, Shimosuwa (JP); Eisuke Kanazawa, Suwa (JP)

(73) Assignee: Seiko Epson Corporation (JP)

( * ) Notice: Subject to any disclaimer, the term of this patent is extended or adjusted under 35 U.S.C. 154(b) by 961 days.

(21) Appl. No.: 11/510,789

(22) Filed: Aug. 25, 2006

(65) Prior Publication Data

US 2007/0047801 A1 Mar. 1, 2007

(30) Foreign Application Priority Data

Aug. 26, 2005 (JP) ................... 2005-245429
Jun. 9, 2006 (JP) ................... 2006-161412

(51) Int. Cl.
*G06K 9/00* (2006.01)

(52) U.S. Cl. .............. 382/149; 382/141; 348/246

(58) Field of Classification Search .......... 382/382, 382/100, 195, 124, 101, 103, 108, 118, 181, 382/141, 156
See application file for complete search history.

(56) References Cited

U.S. PATENT DOCUMENTS 6,799,130 B2 * 9/2004 Okabe et al. ............... 702/82
2006/0012694 A1 * 1/2006 Yoneda et al. ............ 348/246

FOREIGN PATENT DOCUMENTS

| JP | 2002-259951 | 9/2002 |
|---|---|---|
| JP | 2004-028836 | 1/2004 |
| JP | 2004-239870 | 8/2004 |
| JP | 2005-140655 | 6/2005 |
| JP | 2006-133055 | 5/2006 |
| JP | 2006-145228 | 6/2006 |

OTHER PUBLICATIONS

Handbook of Image Analysis (Revised Edition), 2004, p. 1900-1903.

* cited by examiner

*Primary Examiner* — Samir A Ahmed
*Assistant Examiner* — Ruiping Li
(74) *Attorney, Agent, or Firm* — Harness, Dickey & Pierce, P.L.C.

(57) ABSTRACT

A defect detecting method includes: an image acquiring process for capturing an image of an inspection object having an identical sequence of pattern and acquiring the image; and a defect emphasizing process for emphasizing a defect of the captured image. The defect emphasizing process includes: an inspected-point selecting process for sequentially selecting an inspection point on the captured image; and a defect emphasizing value calculating process for obtaining differences by subtracting from a luminance value of the selected inspection point each luminance value of a plurality of comparison points disposed around the inspection point and selecting one difference of the smallest value of the obtained differences in luminance to determine a defect emphasizing value of the inspection point.

4 Claims, 12 Drawing Sheets

DEFECT DETECTING METHOD AND DEFECT DETECTING DEVICE

The entire disclosure of Japanese Patent Applications No. 2006-161412, filed Jun. 9, 2006 and No. 2005-245429, filed Aug. 26, 2005 is expressly incorporated by reference herein.

BACKGROUND

1. Technical Field

The present invention relates to a defect detecting method for automatically detecting a low-contrast defect with accuracy in inspection processes for various products such as an inspection process in manufacturing display devices and projectors, the display devices including a liquid crystal display panel and the projectors being applied products of liquid crystal display panels. The invention also relates to a defect detecting device.

2. Related Art

It has been difficult for a detecting device to automatically detect defects such as a blur defect, an unevenness defect, a luminescent spot and a black spot in an inspection for a liquid crystal display panel such as a TFT (Thin Film Transistor) panel, since such defects generally have different shapes and low contrast. Hence, the inspection is still now conducted by a checker visually, which evokes pressing demands for automating the inspection to reduce the manufacturing cost.

Note that when a certain region of a display screen has a different luminance from the other, in other words, when a certain range is brighter or darker as compared with the surrounding portion, such states are called as a blur defect or an unevenness defect. Generally, when the planar dimension of such defect is relatively small, the defect is called a blur defect. When the planar dimension is relatively large, the defect is called an unevenness defect. When the planar dimension is small to be a spot, the defect is called a luminescent spot or a black spot.

As a method for automating a defect detection for an inspection object such as a liquid crystal display panel that has pixel portions and black matrix portions defining pixels, the pixels being transmitting light to be turned on and the pixel and black matrix portions disposed in an identical sequence of pattern, an eight-adjacent-point comparing method for detecting a defect using pixel data at eight points around the inspection object has been known (see, for example, Document: JP-A-2004-28836).

The document discloses that whether there is a defect or not is judged by selecting two points that are optimum to be used in a comparison with the inspection object out of the eight adjacent points (disposed on the left, right, top, bottom, obliquely upper and lower left and obliquely upper and lower right of the inspection object) and making the comparison between an average value of the selected two points and luminance data of the inspection object. When each luminance data of the two points are the same, such pair of points is judged to be optimum points for the comparison with the inspection object.

However, according to the Document, since one of the two points is in a black matrix portion and the other is in a pixel portion at, for example, one of the four corners of a liquid crystal display panel, the two points disposed with the inspection object interposed, no pair of points can have common luminance data. Accordingly, it is not possible to select two points optimum for the comparison, so that a simulated defect may be detected or the corners may be mistakenly judged to be out of an inspected range, thereby hindering an accurate defect detection at the corners.

As another problem, since the inspection object and the two points to be compared with the inspection object all need to be in either a pixel portion or a black matrix portion, a pitch of the inspection object and the comparison points need to be in line with that of the pixels, thereby complicating the inspection.

SUMMARY

The invention has been accomplished in light of the above-described problems. An object of the invention is to provide a defect detecting method and a defect detecting device for easily detecting a defect even when the defect is at a corner portion of an inspection object.

A defect detecting method according to an aspect of the invention includes: an image acquiring process for capturing an image of an inspection object having an identical sequence of pattern and acquiring the image; and a defect emphasizing process for emphasizing a defect of the captured image. The defect emphasizing process includes: an inspected-point selecting process for sequentially selecting an inspection point on the captured image; and a defect emphasizing value calculating process for obtaining differences by subtracting from a luminance value of the selected inspection point each luminance value of a plurality of comparison points disposed around the inspection point and selecting one difference of the smallest value of the obtained differences in luminance to determine a defect emphasizing value of the inspection point.

Note that the inspection point and the comparison points may be set in pixel unit of a CCD (Charge Coupled Devices) camera by which an image of an inspection object such as a TFT panel is captured.

According to the aspect of the invention, in the defect emphasizing process, the differences in luminance value between the selected inspection point and the plurality of comparison points disposed around the inspection point are obtained by subtracting from the luminance value of the selected inspection point each luminance value of the comparison points, and the difference data of the smallest value is defined as the defect emphasizing value of the inspection point. Hence, even when the defect is at a corner portion of the inspection object, the defect, especially a bright defect can be detected.

In the inspection object such as the TFT panel in which TFT pixel portions and black matrix portions are alternately formed in an identical sequence of pattern, it is only necessary that at least one of the plurality of comparison points is in a common region to the inspection point. More specifically, when the inspection point is in the TFT pixel portion, the at least one comparison point needs to be in the common TFT pixel portion, and when the inspection point in the black matrix portion, the at least one comparison point needs to be in the common black matrix portion. Hence, even when the defect is in a portion on which the defect inspection cannot be conducted with the related art (for example, a corner portion of a TFT panel), the defect can be reliably and accurately detected.

When there is no defect in the inspection point, the luminance value of the inspection point is substantially the same as that of the comparison point, so that the defect emphasizing value (data on the difference obtained by subtracting from the luminance value of the inspection point the luminance value of the comparison point) is small. Accordingly, it is possible to determine that there is no defect.

On the other hand, when there is a defect (a bright defect) in the inspection point, the defect emphasizing value (even if this value is a minimum difference data) becomes larger as compared with the case in which there is no bright defect. Hence, it is possible to determine that there is a bright defect.

In the related art, it has been necessary that the inspection point and the two comparison points disposed so as to sandwich the inspection point are all in a common region. Hence, the allocation pitch between the inspection point and the comparison points need to be adjusted, for example, in line with the allocation pitch of the TFT pixels and the black matrices, which makes the defect detection complicated. In contrast, according to the aspect of the invention, since it is only necessary to position the inspection point and one comparison point in a common region, thereby facilitating the adjustment and simplifying the defect detection.

A defect detecting method according to an aspect of the invention includes: an image acquiring process for capturing an image of an inspection object having an identical sequence of pattern and acquiring the image; and a defect emphasizing process for emphasizing a defect of the captured image. The defect emphasizing process includes: an inspected-point selecting process for sequentially selecting an inspection point on the captured image; and a defect emphasizing value calculating process for obtaining differences by subtracting a luminance value of the selected inspection point from each luminance value of a plurality of comparison points disposed around the inspection point and selecting one difference of the smallest value of the obtained differences in luminance to determine a defect emphasizing value of the inspection point.

According to the aspect of the invention, in the defect emphasizing process, the differences in luminance value between the selected inspection point and the plurality of comparison points disposed around the inspection point are obtained by subtracting the luminance value of the selected inspection point from each luminance value of the comparison points and one difference of the smallest value out of the obtained luminance difference data is defined as the defect emphasizing value of the inspection point. Hence, even when the defect is at a corner portion of the inspection object, the defect, especially a dark defect can be detected.

Accordingly, even when the defect is in a portion on which the defect inspection cannot be conducted with the related art (such as a corner of a TFT panel), the defect can be reliably and accurately inspected. When there is no defect in the inspection point, the luminance value of the inspection point is substantially the same as that of the comparison point, so that the defect emphasizing value (data on the difference obtained by subtracting the luminance value of the inspection point from the luminance value of the comparison point) is small. Accordingly, it is possible to determine that there is no defect.

On the other hand, when there is a defect (a dark defect) in the inspection point, the defect emphasizing value (even if this value is a minimum difference data) becomes larger as compared with the case in which there is no dark defect. Hence, it is possible to determine that there is a dark defect.

Additionally, according to the aspect of the invention, since it is only necessary to position the inspection point and one comparison point in a common region, thereby facilitating the adjustment and simplifying the defect detection.

A defect detecting method according to an aspect of the invention includes: an image acquiring process for capturing an image of an inspection object having an identical sequence of pattern and acquiring the image; and a defect emphasizing process for emphasizing a defect of the captured image. The defect emphasizing process includes: an inspected-point selecting process for sequentially selecting an inspection point on the captured image; and a defect emphasizing value calculating process for: obtaining differences by subtracting from a luminance value of the selected inspection point each luminance value of a plurality of comparison points disposed around the inspection point in order to define one difference of the smallest value of the obtained differences in luminance as a bright defect emphasizing value; and obtaining differences by subtracting the luminance value of the selected inspection point each luminance value of the plurality of comparison points disposed around the inspection point in order to define one difference of the smallest value of the obtained differences in luminance as a dark defect emphasizing value.

According to the aspect of the invention, the smallest value of the luminance difference data obtained by subtracting from the luminance value of the inspection point each luminance value of the comparison points is defined as the bright defect emphasizing value of the inspection point. The smallest value of the luminance difference data obtained by subtracting the luminance value of the inspection point from each luminance value of the comparison points is defined as the dark defect emphasizing value of the inspection point. Hence, even when the defect is at a corner portion of the inspection object, the bright defect and the dark defect can be accurately detected.

A defect detecting method according to an aspect of the invention includes: an image acquiring process for capturing an image of an inspection object having an identical sequence of pattern and acquiring the image; and a defect emphasizing process for emphasizing a defect of the captured image. The defect emphasizing process includes: an inspected-point selecting process for sequentially selecting an inspection point on the captured image; and a defect emphasizing value calculating process for obtaining differences between a luminance value of the selected inspection point and each luminance value of a plurality of comparison points disposed around the inspection point and selecting one difference of the smallest absolute value of the obtained differences in luminance to determine a defect emphasizing value of the inspection point.

Note that the inspection point and the comparison points may be set in pixel unit of a CCD camera by which an image of an inspection object such as a TFT panel is captured.

According to the aspect of the invention, the differences in luminance value between the inspection point and the plurality of comparison points disposed around the inspection points are obtained, and the difference data of the smallest absolute value is defined as the defect emphasizing value of the inspection point. Hence, even when the defect is at a corner portion of the inspection object, such defect can be detected.

In the inspection object such as the TFT panel in which TFT pixel portions and black matrix portions are alternately formed in an identical sequence of pattern, it is only necessary that at least one of the plurality of comparison points is in a common region to the inspection point. More specifically, when the inspection point is in the TFT pixel portion, the at least one comparison point needs to be in the common TFT pixel portion, and when the inspection point in the black matrix portion, the at least one comparison point needs to be in the common black matrix portion. Hence, even when the defect is in a portion on which the defect inspection cannot be conducted with the related art (for example, a corner portion of a TFT panel), the defect can be reliably and accurately detected.

When there is no defect in the inspection point, the luminance value of the inspection point is substantially the same as that of the comparison point, so that the absolute value of the defect emphasizing value (the difference data) is small. Accordingly, it is possible to determine that there is no defect.

On the other hand, when there is a defect (a bright or dark defect) in the inspection point, the defect emphasizing value (even if this absolute value is a minimum difference data) becomes larger as compared with the case in which there is no defect. Hence, it is determine that there is the defect.

In the related art, it has been necessary that the inspection point and the two comparison points disposed so as to sandwich the inspection point are all in a common region. Hence, the allocation pitch between the inspection point and the comparison points need to be adjusted, for example, in line with the allocation pitch of the TFT pixels and the black matrices, which makes the defect detection complicated. In contrast, according to the aspect of the invention, since it is only necessary to position the inspection point and one comparison point in a common region, thereby facilitating the adjustment and simplifying the defect detection.

According to an aspect of the invention, a defect detecting method may preferably includes: a noise removing process for removing a noise component by applying a median filter to a defect emphasizing result obtained in the defect emphasizing value calculating process, a defect extracting process for extracting a defect portion by comparing the defect emphasizing value of the defect emphasizing result from which the noise component has been removed in the noise removing process with a predetermined threshold value, and a defect judging process for judging the defect by obtaining defect information including the planar dimension and the position of the defect portion extracted in the defect extracting process.

In the noise removing process, the median filter may be, for example, a median filter of which median values (mid-values) of the defect emphasizing values of respective nine pixels (3×3) are defined as the defect emphasizing value of the inspection point positioned at the center pixel of the nine pixels.

By using such median filter, noise excluding the defect can be removed, thereby ensuring more accurate defect detection.

In the defect extracting process, the defect is extracted by comparing the defect emphasizing value of the defect emphasizing result from which the noise has been removed with the predetermined threshold value.

For example, in the case in which the difference is obtained by subtracting from the luminance value of the inspection point the luminance value of the comparison point, when the comparison defect is a bright defect brighter than the other portion, the defect emphasizing value becomes positive, while when the comparison defect is a dark defect darker than the other portion, the defect emphasizing value becomes negative. Herein, the bright defect portion is extracted in a region having a luminance value equal to or larger than the preset bright defect threshold value and the dark defect portion is extracted in a region having a luminance value larger than the preset dark defect threshold value, thereby ensuring more accurate defect detection. When the difference is obtained by subtracting the luminance value of the inspection point from the luminance value of the comparison point in detecting the dark defect portion, the dark defect emphasizing value also becomes positive. Hence, the region having a luminance value equal to or more than the preset dark defect threshold value may be extracted as the dark defect portion.

Further, in the defect judging process, since defect information including the planar dimension and position of the defect portion is acquired and the defect is evaluated and judged based on the information, the defect can be objectively evaluated and ranked, thereby facilitating the judgment of poor products.

According to an aspect of the invention, a defect detecting method may preferably includes: a noise removing process for removing a noise component by applying a median filter to a defect emphasizing result obtained in the defect emphasizing value calculating process, a defect extracting process for extracting a defect portion by comparing the defect emphasizing value of the defect emphasizing result from which the noise component has been removed in the noise removing process with a predetermined threshold value, and a defect judging process for judging the defect by obtaining defect information including the planar dimension and the position of the defect portion extracted in the defect extracting process.

According to the aspect of the invention, when all of the inspection point and the comparison points around the inspection point are in one common region, the differences between the points become small, so that it is not possible to detect a defect. On the other hand, in the case in which the distances between the inspection point and the comparison points are too large, it is not possible to detect a defect with accuracy when the inspection points and the comparisons are in different defect portions. In other words, according to the aspect of the invention, the size of a detectable defect may vary in accordance with the distance between the inspection point and the comparison points.

Hence, by changing the distance between the inspection point and the comparison points to sequentially conduct the defect emphasizing process, the defect in accordance with the distance can be emphasized. Therefore, by collectively processing the defect emphasizing results, the potions and sizes of the defects having different sizes can be easily detected.

According to the aspect of the invention, totally eight of the comparison points may be preferably provided and disposed on the left, right, top, bottom, obliquely upper and lower left and obliquely upper and lower right of the inspection point.

Generally, it is only necessary that at least four comparison points are provided around the inspection point. However, when the totally eight of the comparison points are disposed on the left, right, top, bottom, obliquely upper and lower left and obliquely upper and lower right of the inspection point, the defect can be detected more accurately and effectively. More specifically, the more the inspection points are provided, the more accurately the defect can be detected. However, the increased number of difference processing may decrease the processing efficiency. In contrast, according to the aspect of the invention, providing the eight comparison points ensures good accuracy and good processing efficiency in detection.

A defect detecting device according to an aspect of the invention includes: an image acquiring device for capturing an image of an inspection object having an identical sequence of pattern and acquiring the image; and a defect emphasizing device for emphasizing a defect of the captured image. The defect emphasizing device includes: an inspected-point selecting device for sequentially selecting an inspection point on the captured image; and a defect emphasizing value calculator for obtaining differences by subtracting from a luminance value of the selected inspection point each luminance value of a plurality of comparison points disposed around the inspection point and selecting one difference of the smallest value of the obtained differences in luminance to determine a defect emphasizing value of the inspection point.

A defect detecting device according to an aspect of the invention includes: an image acquiring device for capturing an image of an inspection object having an identical sequence of pattern and acquiring the image; and a defect emphasizing device for emphasizing a defect of the captured image. The defect emphasizing device includes: an inspected-point selecting device for sequentially selecting an inspection point on the captured image; and a defect emphasizing value calculator for obtaining differences by subtracting a luminance value of the selected inspection point from each luminance value of a plurality of comparison points disposed around the inspection point and selecting one difference of the smallest value of the obtained differences in luminance to determine a defect emphasizing value of the inspection point.

A defect detecting device according to an aspect of the invention includes: an image acquiring device for capturing an image of an inspection object having an identical sequence of pattern and acquiring the image; and a defect emphasizing device for emphasizing a defect of the captured image. The defect emphasizing device includes: an inspected-point selecting device for sequentially selecting an inspection point on the captured image; and a defect emphasizing value calculator for: obtaining differences by subtracting from a luminance value of the selected inspection point each luminance value of a plurality of comparison points disposed around the inspection point in order to define one difference of the smallest value of the obtained differences in luminance as a bright defect emphasizing value; and obtaining differences by subtracting the luminance value of the selected inspection point each luminance value of the plurality of comparison points disposed around the inspection point in order to define one difference of the smallest value of the obtained differences in luminance as a dark defect emphasizing value.

A defect detecting device according to an aspect of the invention includes: an image acquiring device for capturing an image of an inspection object having an identical sequence of pattern and acquiring the image; and a defect emphasizing device for emphasizing a defect of the captured image. The defect emphasizing device includes: an inspected-point selecting device for sequentially selecting an inspection point in the captured image; and a defect emphasizing value calculator for obtaining differences between a luminance value of the selected inspection point and each luminance value of a plurality of comparison points disposed around the inspection point and selecting one difference of the smallest absolute value of the obtained differences in luminance to determine a defect emphasizing value of the inspection point.

According to an aspect of the invention, a defect detecting device may preferably includes: a noise remover for removing a noise component by applying a median filter to a defect emphasizing result obtained by the defect emphasizing value calculator, a defect extractor for extracting a defect portion by comparing the defect emphasizing value of the defect emphasizing result from which the noise component has been removed by the noise remover with a predetermined threshold value, and a defect judging device for judging the defect by obtaining defect information including the planar dimension and the position of the defect portion extracted by the defect extractor.

These defect detecting devices can provide similar effects and advantages to those of the above-described defect detecting methods.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

Figure 1:
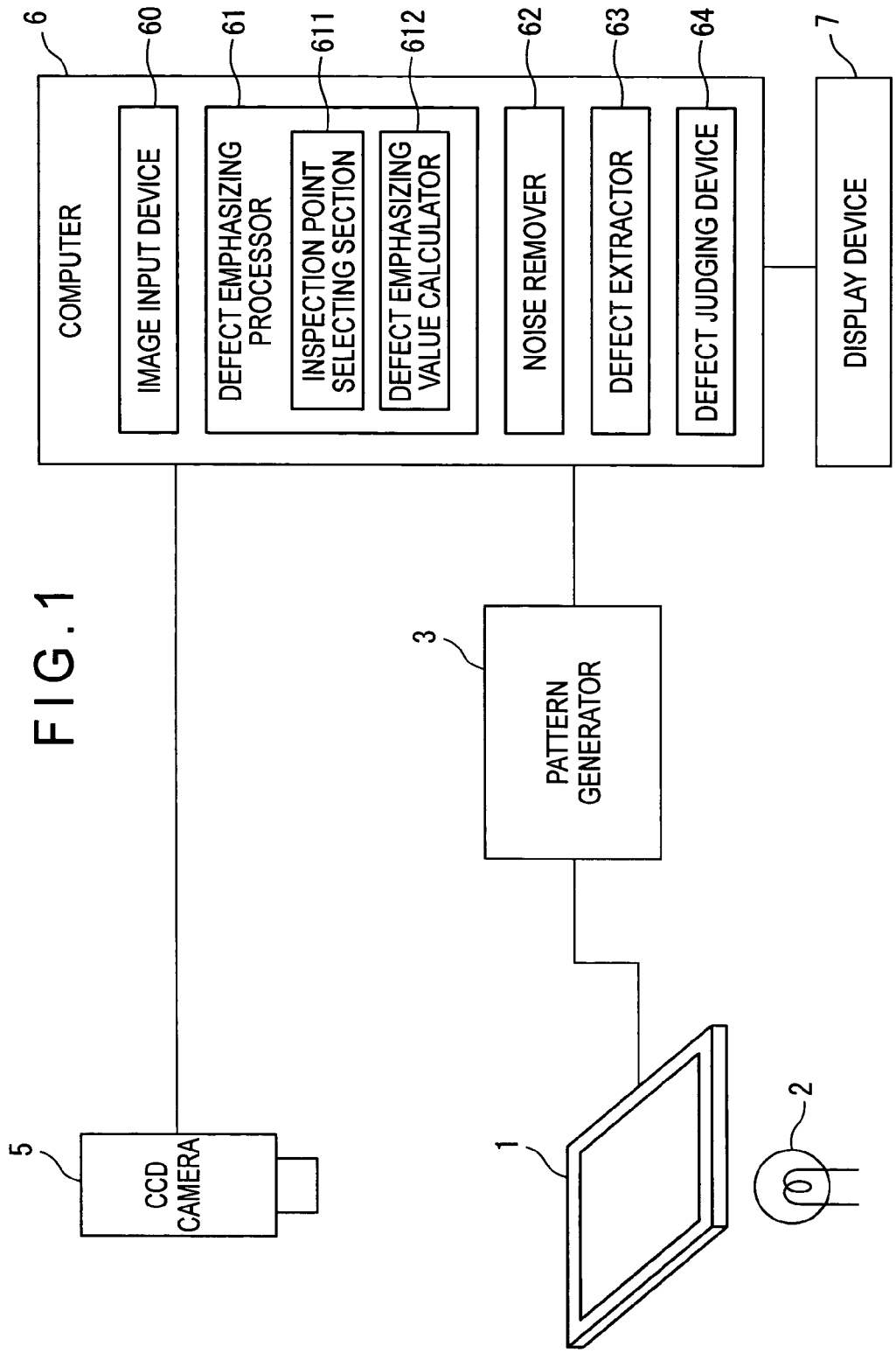
FIG. 1 is a block diagram of a defect detecting device for a screen according to a first exemplary embodiment of the invention.

FIG. 1 is a block diagram of a defect detecting device according to a first exemplary embodiment of the invention.

In FIG. 1, reference numeral 1 is given to a liquid crystal display panel (a TFT panel), which is an inspection object. Reference numeral 2 is given to a light source. Reference numeral 3 is given to a pattern generator (a pattern generating device) for outputting various patterns on the liquid crystal display panel 1. Reference numeral 5 is given to a CCD camera (an image capturing device) for capturing an image of the liquid crystal display panel 1. The CCD camera has a CCD with a resolution higher than that of the liquid crystal display panel 1. Reference numeral 6 is given to a computer (an image processor) that controls the pattern generator 3 and the CCD camera 5 and detects a defect of the liquid crystal display panel 1. Reference numeral 7 is given to a display device connected to the computer 6.

The computer 6 includes an image input device 60, a defect emphasizing processor 61, a noise remover 62, a defect extractor 63 and a defect judging device 64.

Image data of a captured image that is captured by the CCD camera 5 is input to the image input device 60 of the computer 6. The captured image is stored in a storage not shown. Accordingly, the image input device 60 conducts an image acquiring process (an image capturing process) for capturing an image of an inspection object using the CCD camera 5.

The defect emphasizing processor 61 conducts a defect emphasizing process for processing the captured image to emphasize a defect. The defect emphasizing processor 61 includes an inspection point selecting section 611 and a defect emphasizing value calculator 612. The inspection point selecting section 611 conducts an inspected-point selecting process for sequentially selecting an inspection point in the captured image. The defect emphasizing value calculator 612 conducts a defect emphasizing value calculating process in which difference values between a luminance value of the selected inspection point and each luminance value of a plurality of comparison points disposed around the selected inspection point in order to select the smallest difference value to determine a defect emphasizing value of the selected inspection point.

Note that the defect may be a bright defect, which has a higher luminance value than the other pixel portions or may be a dark defect, which has a lower luminance value. Accordingly, the defect emphasizing value calculator 612 of the first exemplary embodiment is adapted to calculate both of the defect emphasizing values of the bright and dark defects independently.

The noise remover 62 conducts a noise removing process for removing noise from the result obtained with the defect emphasizing processor 61 (a defect emphasizing result of the bright defect and a defect emphasizing result of the dark defect) by using a median filter.

The defect extractor 63 extracts a defect candidate by comparing a predetermined threshold value and the result obtained with the noise remover 62. As the threshold value, a bright defect threshold value and a dark defect threshold value are set. A bright defect region is extracted by comparing the bright defect emphasizing result from which noise has been removed and the bright defect threshold value. A dark defect region is extracted by comparing the dark defect emphasizing result from which noise has been removed and the dark defect threshold value.

The defect judging device 64 evaluates a rank of the defect based on planar dimensions and positions of the extracted defect regions to classify the inspection object into a corresponding defect rank.

Next, the operation of the defect detecting device according to the first exemplary embodiment of the invention will be described below.

Figure 2:
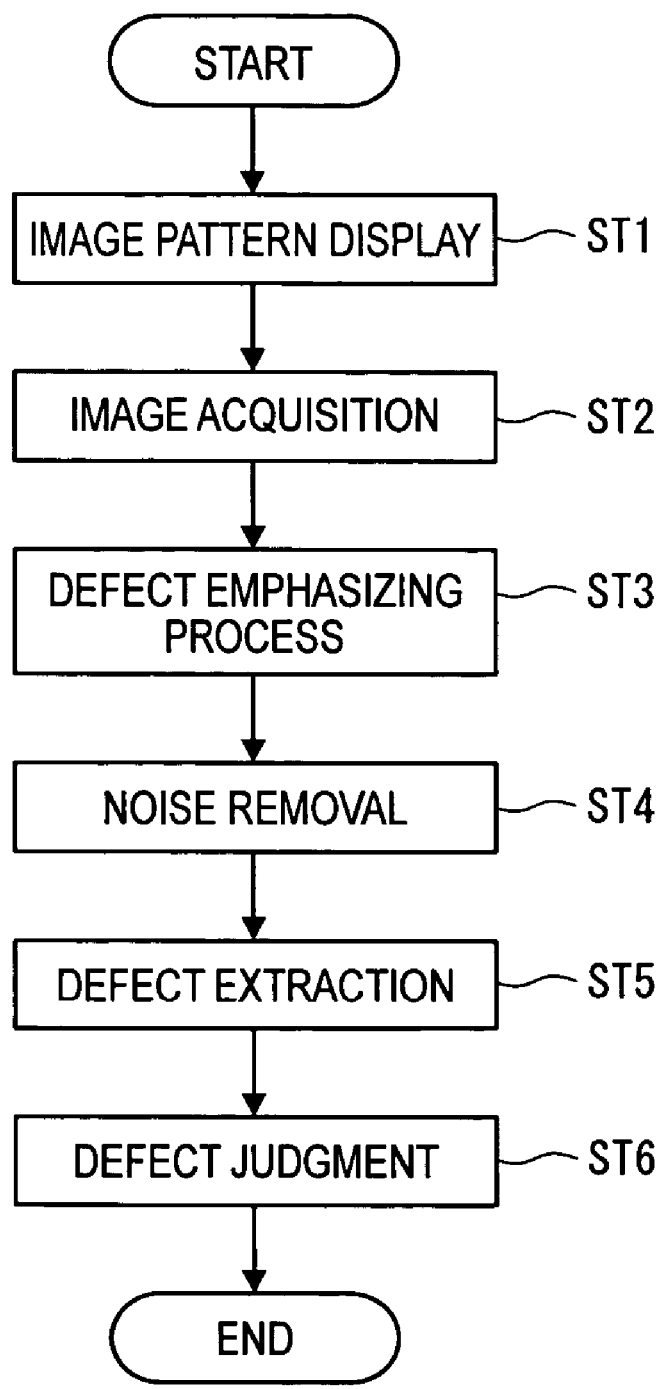
FIG. 2 is a flowchart for explaining the operation of the defect detecting device.

FIG. 2 is a flowchart for explaining the operation of the defect detecting device of the first exemplary embodiment. The operation shown in FIG. 2 is performed by a program executed on the computer 6.

First, the liquid crystal display panel 1 (the inspection object) is set. The computer 6 controls the pattern generator 3 to display a certain image pattern on the liquid crystal display panel 1 (Step 1, "Step" is abbreviated as "ST" in the description below).

The image pattern displayed by the pattern generator 3 may be a white screen pattern in which an entire screen is displayed in white to facilitate a detection for dark defects, a black screen pattern in which the whole screen is displayed in black to facilitate a detection for bright defects, a neutral tone screen pattern or the like. Thus, the image pattern may be appropriately set in accordance with the type of defects to be detected.

The image input device 60 captures an image of the liquid crystal panel 1 with the CCD camera 5 and conducts the image acquiring process (the image capturing process) to import the captured image data (ST2). At this time, the captured image data is converted into digital data of 4096 gradation sequence (12 bits) by an analog-digital converter (not shown) to be imported to the computer 6.

The defect emphasizing processor 61 conducts the defect emphasizing process for emphasizing a defect of the imported image (ST3). The defect emphasizing process ST3 is conducted for emphasizing the defect in the image only, since it is difficult to detect a low-contrast defect as it is. The defect emphasizing process ST3 is conducted in a process flow shown in FIG. 3.

The defect emphasizing processor 61 first selects the inspection point (the point to be inspected) with the inspection point selecting section 611 (ST31). A positional relationship (a direction and a distance) between the inspection point and the comparison points is preset, so that selecting the inspection points determines the comparison points.

Figure 4:
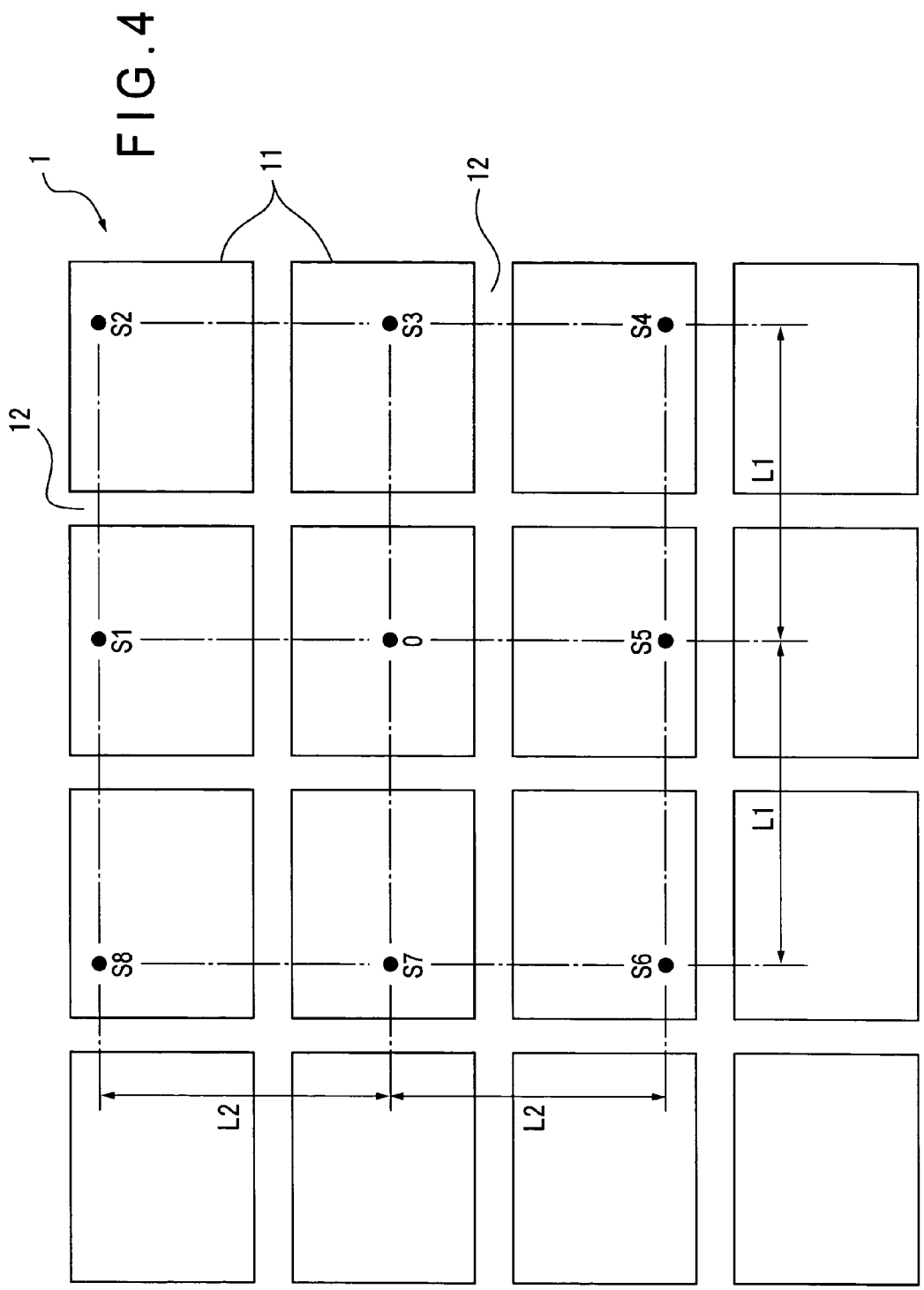
FIG. 4 shows an example of an allocation of an inspection point and comparison points in a captured image.

As shown in FIG. 4, in the first exemplary embodiment, the inspection points are selected in pixel unit of the CCD camera 5 that has a higher resolution as compared with TFT pixels 11 of the liquid crystal display panel 1. Note that rectangles in FIG. 4 are the TFT pixels 11 of the liquid crystal display panel 1 and portions therebetween are black matrices 12.

In the first exemplary embodiment, comparison points S1, S5 are respectively disposed on the top and the bottom of an inspection point O (in a vertical direction). Comparison points S7, S3 are respectively disposed on the left and right of the inspection point O (in a horizontal direction). Comparison points S2, S6 are disposed in an oblique direction (respectively on the upper right and the lower left of the inspection point O). Comparison points S8, S4 are disposed in an oblique direction (respectively on the upper left and the lower right of the inspection point O).

Each pair of the comparison points S1 and S5, S2 and S6, S3 and S7, and S4 and S8 are set at symmetric positions about the inspection point O.

The comparison points S1 and S5 and the inspection point O; the comparison points S2, S3 and S4; and the comparison points S8, S7 and S6 are each disposed in a vertical alignment.

The comparison points S2, S1 and S8; the comparison points S3, S7 and the inspection point O; and the comparison points S4, S5 and S6 are each disposed in a horizontal alignment.

Distances between the comparison points S1 and S2, between the comparison points S1 and S8, between the comparison points S5 and S4 and between the comparison points S5 and S6 are each set to be the same as distances (a horizontal pitch L1) between the inspection point O and the comparison point S3 and between the inspection point O and the comparison point S7.

Distance between the comparison points S3 and S2, between the comparison points S3 and S4, between the comparison points S7 and S6 and between the comparison points S7 and S8 are each set to be the same as distances (a vertical pitch L2) between the inspection point O and the comparison point S1 and between the inspection point O and the comparison point S5.

The horizontal pitch L1 is set to be different from a horizontal pitch of the pixels 11 of the liquid crystal display panel 1 (specifically, from a pitch from the center point of a first pixel 11 to the center point of a second pixel 11 next to the first pixel, which is the same as a pitch between the center points of two black matrices 12 with a pixel 11 interposed therebetween). In the first exemplary embodiment, the horizontal pitch L1 is set to be larger than that of the pixels 11.

Similarly, the vertical pitch L2 is set to be different from a vertical pitch of the pixels 11 of the liquid crystal display panel 1 (specifically, from a pitch from the center point of a first pixel 11 to the center point of a second pixel 11 vertically next to the first pixel, which is the same as a pitch between the center points of two black matrices 12 with a pixel 11 interposed therebetween). In the first exemplary embodiment, the vertical pitch L2 is set to be larger than that of the pixels 11.

According to an aspect of the invention, it is only necessary that one of the comparison points S1 to S8 is in a common region as the inspection point O. Concretely, when the inspection point O is in a pixel 11 portion, only the one of the comparison points S1 to S8 needs to be in the pixel 11 portion. In other words, it is not necessary that the inspection point O and two comparison points sandwiching the inspection point O are in a common region unlike the related art. Hence, the pitch L1 and the pitch L2 do not need to be in line with the pitch of the pixels 11.

From the same reason, the vertical pitch L1 and the horizontal pitch L2 may be the same or different from each other.

Figure 3:
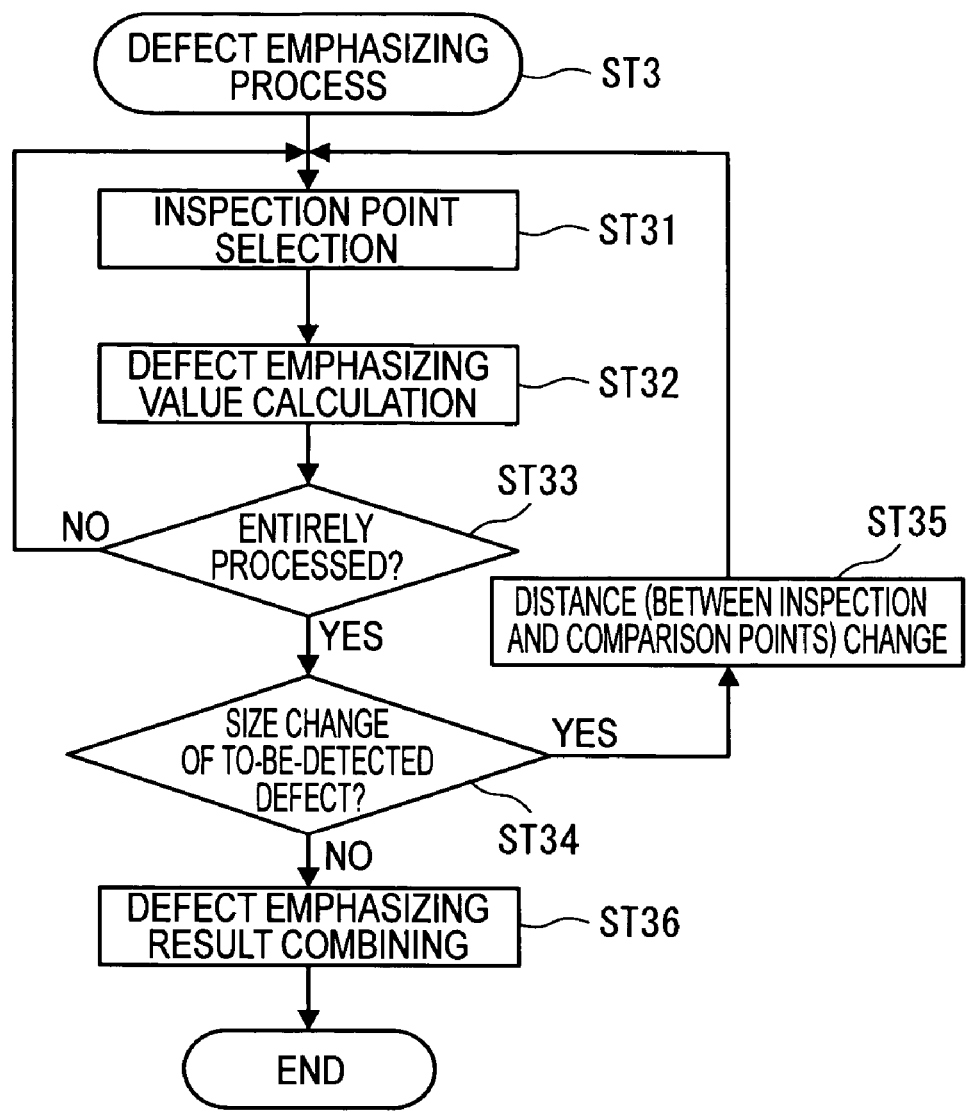
FIG. 3 is a flowchart for explaining a defect emphasizing process.

As shown in FIG. 3, after the inspection point O and the comparison points S1 to S8 are selected (ST31), the defect emphasizing processor 61 conducts the defect emphasizing value calculating process (ST32). More specifically, the defect emphasizing value calculator 612 of the defect emphasizing processor 61 calculates the defect emphasizing value of a bright defect and the defect emphasizing value of a dark defect.

In order to calculate the defect emphasizing value of the bright defect, the defect emphasizing value calculator 612 obtains differences F by subtracting each luminance value of the comparison points S1 to S8 from the luminance value of the inspection point O. Specifically, where the luminance value of the inspection point O is defined as "O" and the luminance values of the respective comparison points S1 to S8 are defined as "S1 to S8", the differences F1 to F8 are calculated using equations 1 to 8 below.

$F1 = O - S1$ (Equation 1)

$F2 = O - S2$ (Equation 2)

$F3 = O - S3$ (Equation 3)

$F4 = O - S4$ (Equation 4)

$F5 = O - S5$ (Equation 5)

$F6 = O - S6$ (Equation 6)

$F7 = O - S7$ (Equation 7)

$F8 = O - S8$ (Equation 8)

The defect emphasizing value calculator 612 obtains values of the differences F1 to F8 using the above-listed equations and selects the smallest value as a defect emphasizing result of the bright defect of the inspection point O.

When no defect is in an area enclosed by the comparison points S1 to S8, the differences in luminance value between the inspection point O and the comparison points S1 to S8 are almost none. Hence, the values of the differences F1 to F8 are all small.

Figure 5:
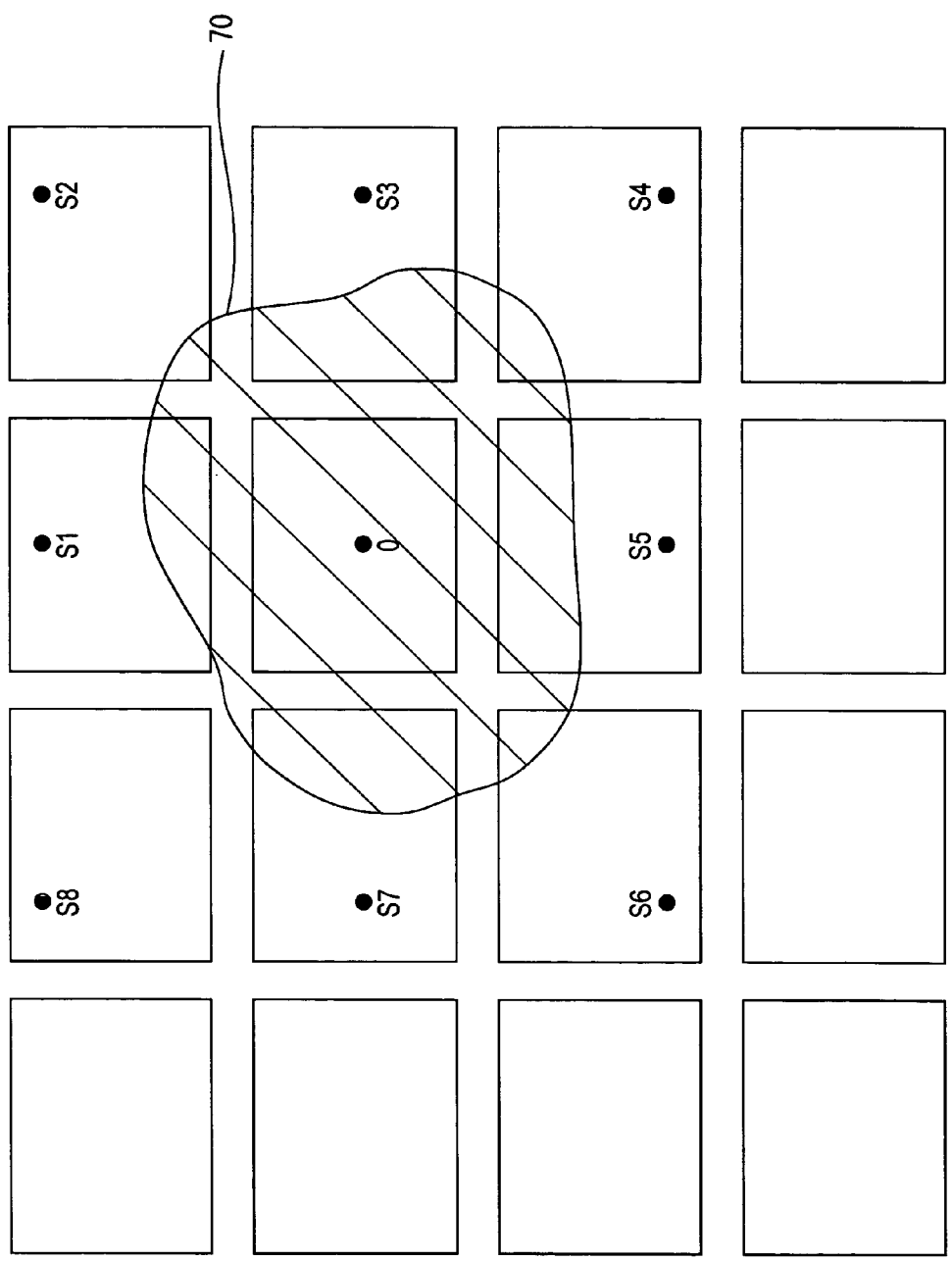
FIG. 5 shows an example of a defect detected using the first exemplary embodiment.

On the other hand, as shown in FIG. 5, when a defect 70 brighter than the other portion exists in the area enclosed by the comparison points S1 to S8 and the inspection point O is contained in the defect 70, the luminance values of the comparison points S1 to S8 are lower than that of the inspection point O. Hence, the values of the differences F1 to F8 are larger as compared with the above case in which no defect 70 exists.

Figure 6:
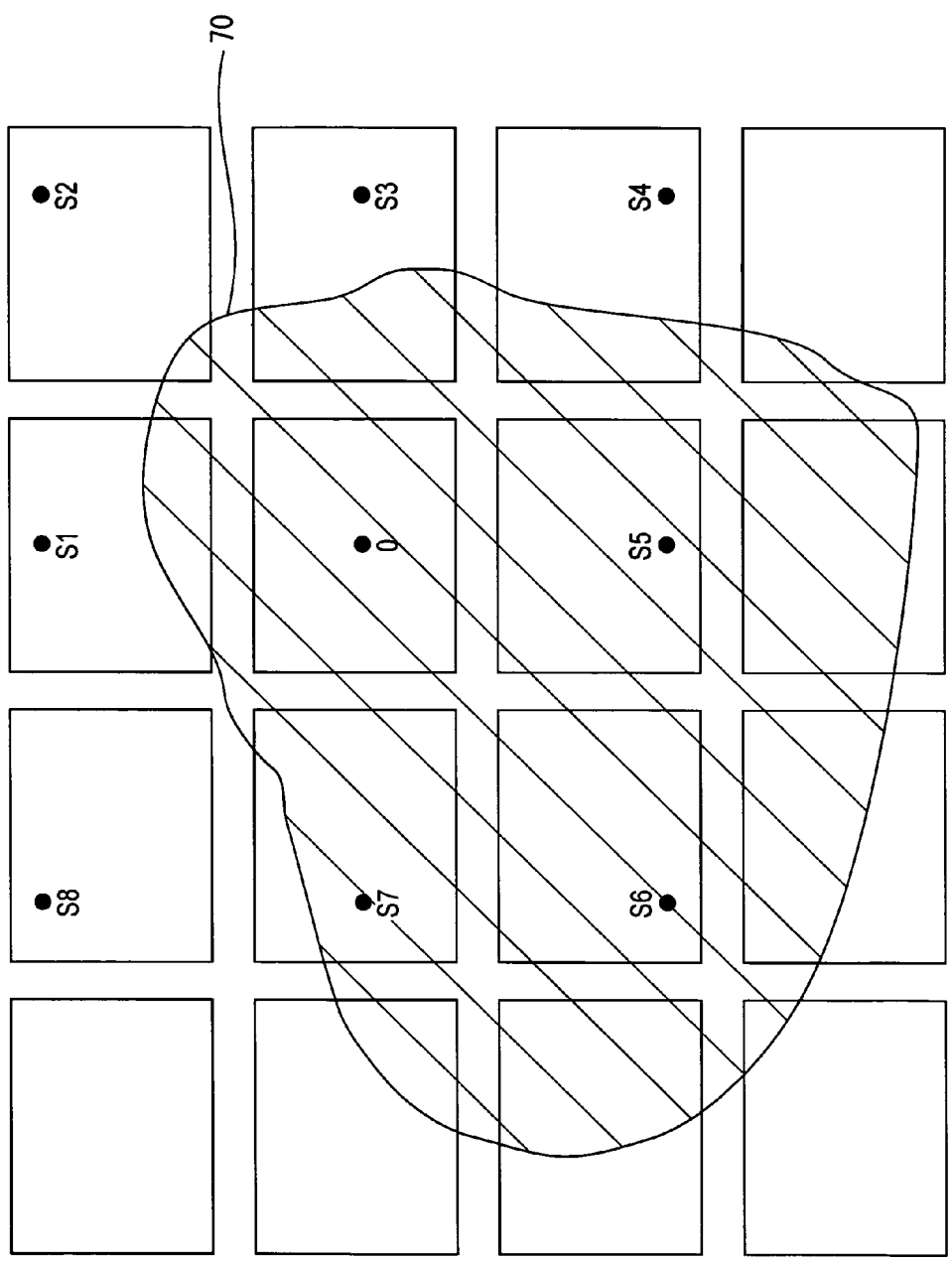
FIG. 6 shows an example of a blur defect that is not detected using the first exemplary embodiment.

As shown in FIG. 6, when not only the inspection point O but also some comparison points S5, S6, S7 are in the defect 70, the differences in luminance value between the inspection point O and the comparison points S5 to S7 in the defect 70 are small.

Accordingly, when the bright defect 70 is inside the area enclosed by the comparison points S1 to S8 as shown in FIG. 5, the values of the differences F1 to F8 are all relatively large. On the other hand, when the defect 70 does not exist or is not completely inside the area enclosed by the comparison points S1 to S8 (FIG. 6), at least one value of the differences F1 to F8 is relatively small. Therefore, whether or not the bright defect 70 that contains the inspection point O and is inside the area enclosed by the comparison points S1 to S8 exists can be detected by selecting the smallest value of the differences F1 to F8, so that the selected smallest value is stored as the defect emphasizing value for the inspection point O.

Next, in order to calculate the defect emphasizing value of the dark defect, the defect emphasizing value calculator 612 obtains differences F by subtracting the luminance value of the inspection point O from each luminance value of the comparison points S1 to S8. More concretely, the differences F9 to F16 are calculated using equations 9 to 16 below.

$F9 = S1 - O$ (Equation 9)

$F10 = S2 - O$ (Equation 10)

$F11 = S3 - O$ (Equation 11)

$F12 = S4 - O$ (Equation 12)

$F13 = S5 - O$ (Equation 13)

$F14 = S6 - O$ (Equation 14)

$F15 = S7 - O$ (Equation 15)

$F16 = S8 - O$ (Equation 16)

The defect emphasizing value calculator 612 obtains values of the differences F9 to F16 using the above-listed equations and select the smallest value as a defect emphasizing result of the dark defect of the inspection point O.

Similarly to the bright defect, when the dark defect is inside the area enclosed by the comparison points S1 to S8, the values of the differences F9 to F16 are all relatively large. When the defect does not exist or is not completely inside the area enclosed by the comparison points S1 to S8, at least one value of the differences F9 to F16 is relatively small. Therefore, whether or not the dark defect that contains the inspection point O and is inside the area enclosed by the comparison points S1 to S8 exists can be detected by selecting the smallest value out of the F9 to F16, so that the selected smallest value is stored as the defect emphasizing value for the inspection point O.

As shown in FIG. 3, the defect emphasizing processor 61 judges whether or not the defect emphasizing process for the bright and dark defects have been completed for the entire acquired image (ST33). When the entire acquired image has not been processed with the defect emphasizing process, the inspection object O is moved (ST31) to conduct the defect emphasizing value calculating process ST32. When the inspection point O is set in pixel unit of the CCD camera 5, the inspection point O is moved to a next pixel to receive the defect emphasizing value calculating process ST32 thereon.

On the other hand, when the acquired image ST33 has been entirely processed, whether or not a defect detection size needs to be changed is judged (ST34).

The defect emphasizing process conducted by the defect emphasizing processor 61 is suitable for extracting a defect having a slightly smaller planar dimension than the planar dimension enclosed by the comparison points S1 to S8. In other words, as shown in FIG. 6, a defect having a larger planar dimension than the planar dimension enclosed by the comparison points S1 to S8 cannot be detected. In addition, when a defect has an extremely small planar dimension as compared with the planar dimension enclosed by the comparison points S1 to S8, another defect may possibly be on one of the comparison points S1 to S8, which decreases detection accuracy.

Hence, when defects in a plurality of sizes need to be emphasized, the distance between the inspection point O and the comparison points S1 to S8 is set in line with the defect sizes to conduct the inspected-point selecting process ST31 and the defect emphasizing value calculating process ST32.

Accordingly, when the defect emphasizing processor 61 is set to detect a defect having another size in ST34, the defect emphasizing processor 61 changes the distance between the inspection point O and the comparison points S1 to S8 (ST35) and conducts again the inspected-point selecting process ST31 and the defect emphasizing value calculating process ST32.

Figure 7:
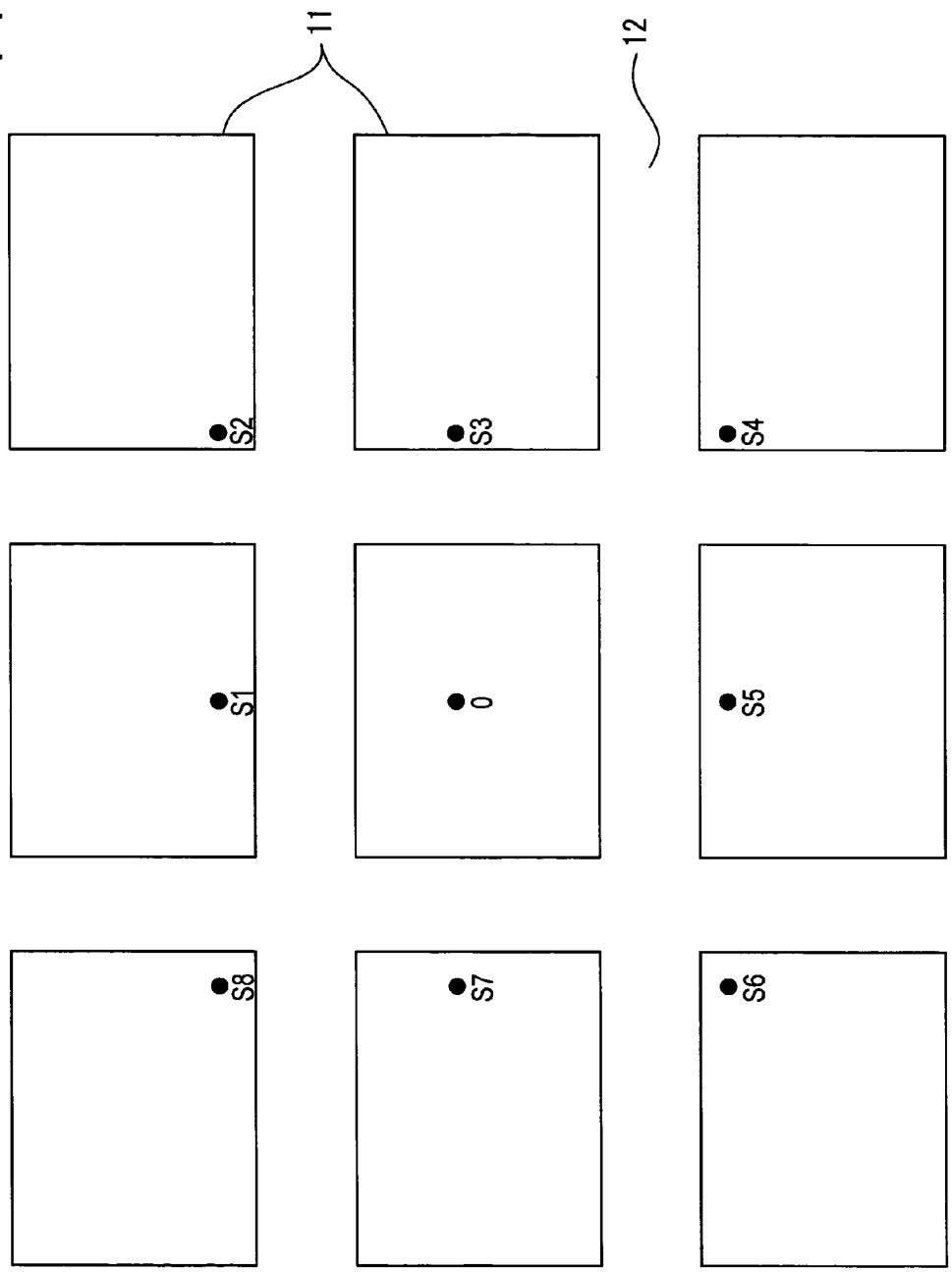
FIG. 7 shows another example of the allocation of the inspection point and the comparison points.
Figure 8:
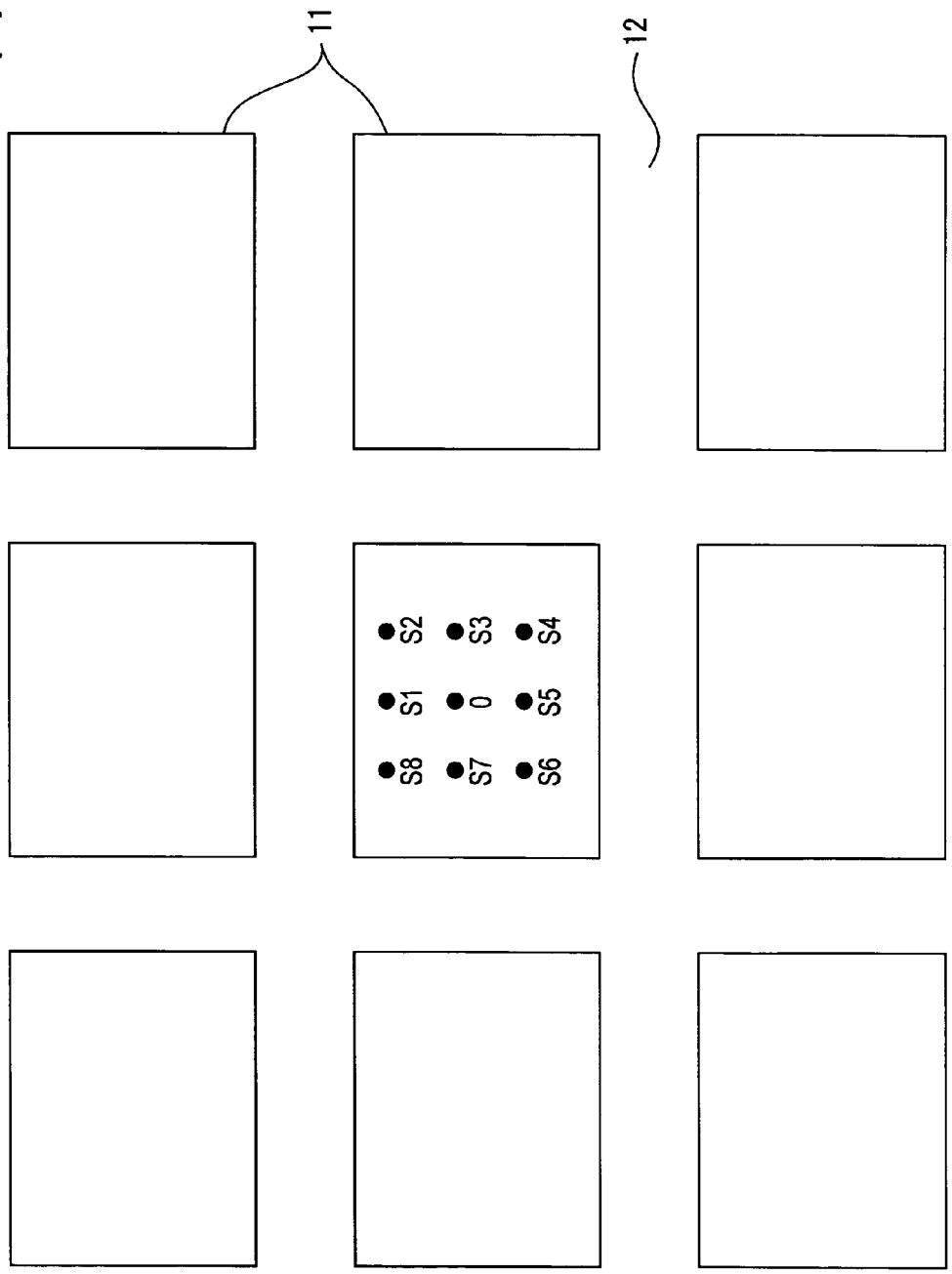
FIG. 8 shows still another example of the allocation of the inspection point and the comparison points.

In the first exemplary embodiment, as shown in FIGS. 7 and 8, the defect emphasizing value calculating process ST32 is conducted on the entire image of the inspection object by changing the distance between the inspection point O and the comparison points S1 to S8, thereby detecting: the slightly smaller defect than the defect 70 shown in FIG. 5 using the setting of FIG. 7; and the extremely small defect using the setting of FIG. 8.

The defect emphasizing processor 61 repeats the processes ST31 to ST35 until the defect detections for the prespecified sizes have been completed. When the result becomes "No" in the process ST34, the bright defect emphasizing results for each size are collectively processed to determine one bright defect emphasizing result and the dark defect emphasizing results for each size are collectively processed to determine one dark defect emphasizing result. The defect emphasizing processor 61 outputs the one bright defect emphasizing result and the one dark defect emphasizing result (ST36).

For example, when the defect emphasizing value calculating process ST32 is conducted for three distances between the inspection point O and the comparison points S1 to S8 as shown in FIGS. 4, 7 and 8, three bright defect emphasizing results and three dark defect emphasizing results are obtained, so that each three results are lastly and collectively processed. The defect emphasizing results are stored in an array in line with that of the inspection points O (the pixels of the CCD camera 5). Hence, one defect emphasizing result can be selected by comparing the defect emphasizing values of the points (the pixels) having a common defect emphasizing result and selecting a maximum value as the defect emphasizing value of the inspection point O.

The emphasizing results are thus collectively processed to improve the detection accuracy. Specifically, defects having different sizes can be detected with accuracy by changing the distance between the inspection point O and the comparison points S1 to S8. In addition, when the defect is extracted from each emphasizing result to be individually evaluated, one defect may be divided into a plurality of emphasizing results for different sizes to be detected, causing a mismatch between the actual defect and the emphasizing results. In order to match the results, the divided defects are collectively processed into one by collectively processing the plurality of emphasizing results, thereby enhancing the detection accuracy.

As shown in FIG. 2, when the defect emphasizing process ST3 is completed, the noise remover 62 conducts the noise removing process in which the results (a bright defect detected image and a dark defect detected image) of the defect emphasizing process ST3 are filtered with a median filter in order to connect and smooth defect components that are divided by noise such that noise excluding the defect is removed (ST4). The median filter used herein may be, for example, a median filter of which median values (mid-values) of the luminance values of respective nine pixels (3×3) are defined as the luminance value of the inspection point positioned at the center pixel of the nine pixels.

Next, the defect extractor 63 conducts a defect extracting process on the defect emphasizing results from which the noise has been removed. The defect extractor 63 sets a threshold value for extracting the bright defect and a threshold value for extracting the dark defect in order to extract a possibly-defected region (ST5). Specifically, the defect extractor 63 detects a region having a luminance value equal to or more than the bright defect threshold value for the bright defect emphasizing result as well as a region having a luminance value equal to or more than the dark defect threshold value for the dark defect emphasizing result.

The threshold values herein may be appropriately set in accordance with the state of the image. For example, the threshold values may be set using the equations below by obtaining an average value and standard deviations of the defect emphasizing values (the luminance values).

Bright defect threshold value: $wslevel = avr + \alpha 1 \cdot \sigma + \beta 1$ Dark defect threshold value: $bslevel = avr + \alpha 2 \cdot \sigma + \beta 2$ Herein, avr is an average value of each defect emphasizing value; $\sigma$ is a standard deviation of the defect emphasizing value; and $\alpha 1$, $\alpha 2$, $\beta 1$ and $\beta 2$ each are an arbitrary number, which is appropriately determined in accordance with the state of the image to be inspected.

Figure 9:
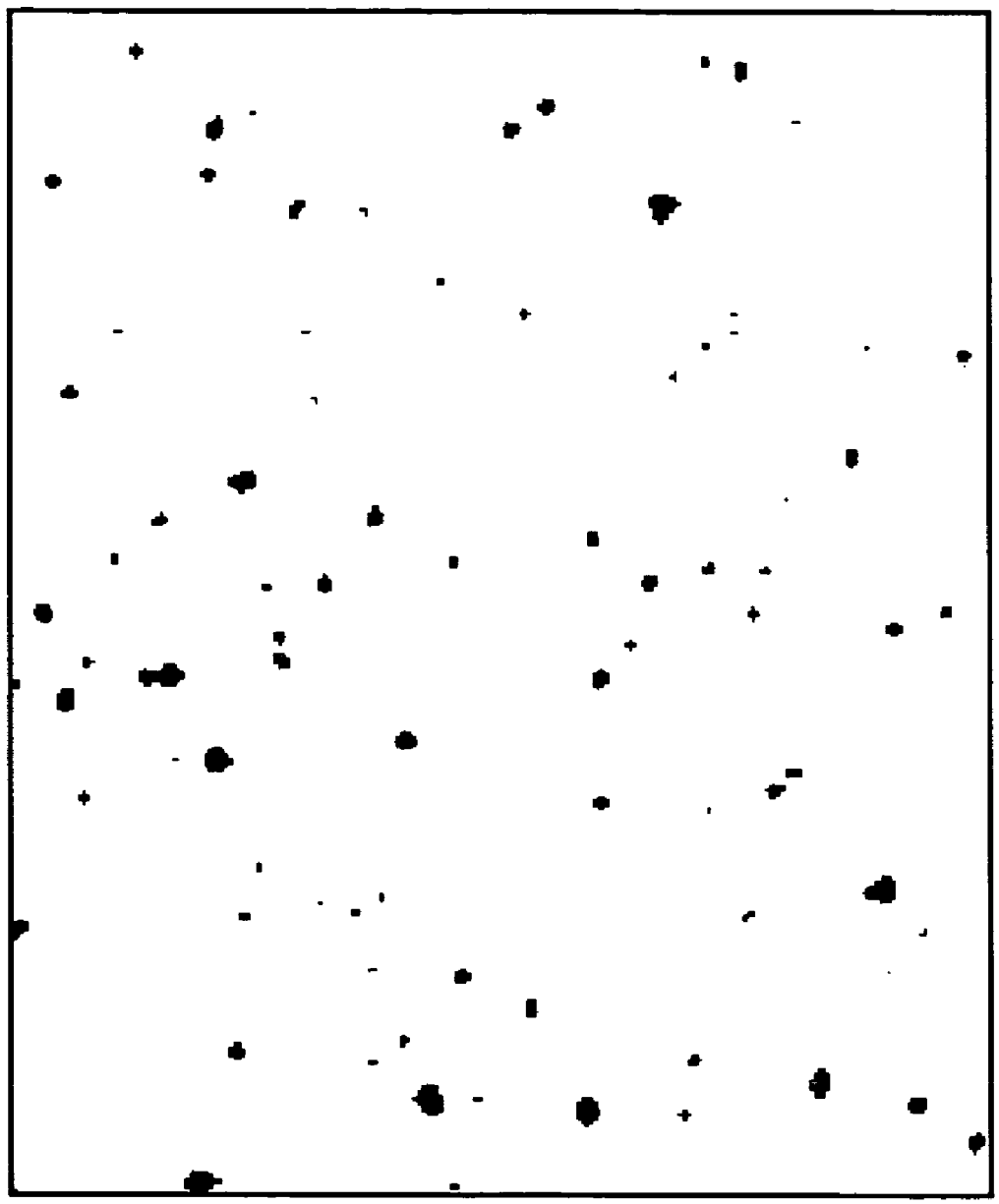
FIG. 9 shows a result of a defect detection.

FIG. 9 shows a binarized result of the process of the noise remover 62, the binarizing conducted with a predetermined defect threshold value. FIG. 9 shows the result obtained by extracting the bright defect emphasizing result by using the bright defect threshold value. The black regions are extracted bright defect regions. Although not shown in the figures, the defect extractor 63 also extracts dark defect regions by binarizing the dark defect emphasizing result of the process of the noise remover 62 by using the dark defect threshold value.

Next, the defect judging device 64 conducts on a bright defect extracted image and a dark defect extracted image a defect judging process (ST6) in which the planar dimension and the position of a defect region are obtained to classify the rank of the defect in the images.

The defect rank obtained by the defect judging device 64 is displayed on the display device 7, so that a checker can easily know the defect rank of the inspected liquid crystal display panel 1.

The first exemplary embodiment may provide advantages below.

1 The defect emphasizing processor 61 obtains the differences in luminance value between the inspection point O that is set for the captured image and the eight comparison points S1 to S8 set around the inspection point O. The value of the smallest difference is defined as the defect emphasizing value of the inspection point O. Hence, when at least one of the eight comparison points S1 to S8 is in a region common with the inspection point O (in a common pattern of the inspection object), the defect can be emphasized to be detected. Thus, even when a defect is at a corner of the liquid crystal display panel 1, the defect can be detected with accuracy. Therefore, the defect with a low-contrast can be detected with accuracy, even when the defect with a low contrast exists in an identical sequence of pattern.

2 Unlike the related art, since it is not necessary that the two comparison points are disposed in a common region with the inspection point O interposed, it is not necessary that the distance between the inspection point O and the comparison points S1 to S8 is in line with an allocation pitch of the common pattern such as the TFT pixels 11 and the black matrices 12. Hence, the setting of the inspection point O and the comparison points S1 to S8 can be facilitated, thereby simplifying the defect detection.

3 In addition, the size of the defect to be emphasized can be set by appropriately setting the distance between the inspection point O and the comparison points S1 to S8, so that the defect of the desired size can be easily and accurately detected.

Further, in the defect emphasizing process ST3, the defect emphasizing value calculating process ST32 is firstly conducted to emphasize defects of a variety of sizes by changing the distance between the inspection point O and the comparison points S1 to S8. Since the defect emphasizing results are subsequently and collectively processed in a defect emphasizing result combining process ST36, it is only necessary to evaluate the selected result to easily detect the defects of the variety of sizes.

4 In the first exemplary embodiment, the defect emphasizing value is calculated using the difference between the luminance value of the inspection point O and the comparison points S1 to S8, so that the luminance value of a point between the inspection point O and the comparison points S1 to S8 is not used. Accordingly, when the defect is smaller than the area enclosed by the comparison points S1 to S8 and contains the inspection point O, the defect can be detected (even when the defect size varies to some extent) in a similar manner to the judgment visually conducted by the checker. Hence, it is not necessary to finely set the distance between the inspection point O and the comparison points S1 to S8, thereby reducing the number of the defect emphasizing value calculating process ST32 conducted for each changed distance and thus reducing the inspection time.

5 The bright defect emphasizing value is calculated with the smallest value of the differences F1 to F8. The dark defect emphasizing values are individually calculated with the calculated values of the differences F9 to F16. Hence, defect portions of both of the bright and dark defects can be accurately emphasized. In addition, the defect extractor 63 extracts the bright and dark defects by respectively using the bright and dark defect threshold values, so that both of the bright and dark defects can be easily and accurately detected. Thus, a variety type of defects can be effectively detected with a simple process.

6 The defect judging device 64 classifies the rank of the extracted defect, so that the defect can be ranked objectively in a short period of time. Hence, the checker can easily judge the level of the defect and provide a quick judgment whether or not the inspection object is a good product.

Second Exemplary Embodiment

Next, a second exemplary embodiment of the invention will be described.

The second exemplary embodiment differs from the first exemplary embodiment only in a method by which the defect emphasizing value calculator 612 concretely performs the defect emphasizing value calculating process ST32. The other processes are the same as the first exemplary embodiment. Hence, only the difference between the first and second exemplary embodiments will be explained below.

Specifically, the defect emphasizing value calculator 612 of the defect emphasizing processor 61 obtains the differences F by subtracting the luminance values of the comparison points S1 to S8 from the luminance value of the inspection point O. Where the luminance value of the inspection point O is defined as "O" and the luminance values of the respective comparison points S1 to S8 are defined as "S1 to S8", the differences F17 to F24 are calculated using equations 17 to 24 below.

$$F17 = O - S1 \quad \text{(Equation 17)}$$

$$F18 = O - S2 \quad \text{(Equation 18)}$$

$$F19 = O - S3 \quad \text{(Equation 19)}$$

$$F20 = O - S4 \quad \text{(Equation 20)}$$

$$F21 = O - S5 \quad \text{(Equation 21)}$$

$$F22 = O - S6 \quad \text{(Equation 22)}$$

$$F23 = O - S7 \quad \text{(Equation 23)}$$

$$F24 = O - S8 \quad \text{(Equation 24)}$$

The defect emphasizing value calculator 612 obtains values of the differences F17 to F24 using the above-listed equations and select the smallest absolute value as a defect emphasizing result of the inspection point O.

When no defect is in an area enclosed by the comparison points S1 to S8, the differences in luminance value between the inspection point O and the comparison points S1 to S8 are almost none. Hence, the values of the differences F17 to F24 are all small.

On the other hand, when a defect 70 brighter than or a defect darker than the other portion exists in the area enclosed by the comparison points S1 to S8; and the inspection point O is contained in the defect 70, the luminance values of the comparison points S1 to S8 are larger than that of the inspection point O. Hence, the absolute values of the differences F17 to F24 are larger as compared with the above case in which no defect 70 exists.

When the inspection point O and some comparison points S5, S6, S7 are in the defect 70, the differences in luminance value between the inspection point O and the comparison points that are not in the defect 70 are large. However, the differences in luminance value between the inspection point O and the comparison points that are in the defect 70 are small.

Accordingly, when the defect 70 is inside the area enclosed by the comparison points S1 to S8, the absolute values of the differences F17 to F24 are all relatively large. On the other hand, when the defect does not exist or the defect 70 is not completely inside the area enclosed by the comparison points S1 to S8, at least one of the absolute values of the differences F17 to F24 is relatively small. Therefore, whether or not the defect 70 that contains the inspection point O and is completely inside the area enclosed by the comparison points S1 to S8 exists can be detected by selecting a minimum absolute value from the differences F17 to F24, so that the selected minimum absolute value is stored as the defect emphasizing value for the inspection point O.

The defect emphasizing processor 61 judges whether or not the defect emphasizing process has been completed for the entire acquired image. When the image has not been entirely processed, the inspection object O is moved to conduct the defect emphasizing value calculating process ST32. When the inspection point O is set in pixel unit of the CCD camera 5, the inspection point O is moved to a next pixel to receive the defect emphasizing value calculating process thereon.

On the other hand, when the acquired image has been entirely processed in ST33, whether or not a defect detection size needs to be changed is judged (ST34), which is similar to the first exemplary embodiment.

When defects of a plurality of sizes need to be emphasized, the distance between the inspection point O and the comparison points S1 to S8 is set in line with the defect sizes to conduct the inspected-point selecting process ST31 and the defect emphasizing value calculating process ST32, which is also similar to the first exemplary embodiment.

Similarly to the first exemplary embodiment, the defect emphasizing processor 61 repeats the processes ST31 to ST35 until the defect detections for each prespecified size have been completed. When the result of the process ST34 becomes "No", the defect emphasizing results for the sizes are collectively processed to be output as one defect emphasizing result (ST36).

Similarly to the first exemplary embodiment, when the defect emphasizing process ST3 is completed, the noise remover 62 then conducts the noise removing process in which the results of the defect emphasizing process ST3 are filtered with a median filter in order to connect and smooth defect components divided by noise such that noise excluding the defect is removed (ST4).

Next, the defect extractor 63 conducts a defect extracting process (ST5) on the defect emphasizing results from which the noise has been removed. In the process ST5, the defect extractor 63 sets a threshold value for extracting the bright defect and a threshold value for extracting the dark defect in order to extract a possibly-defected region.

The threshold values herein may be appropriately set in accordance with the state of the image, which is similar to the first exemplary embodiment.

Next, the defect judging device 64 conducts on a bright defect extracted image and a dark defect extracted image a defect judging process (ST6) in which the planar dimension and the position of a defect region are obtained to classify the rank of the defect in the images.

The defect rank obtained by the defect judging device 64 is displayed on the display device 7, so that a checker can easily know the defect rank of the inspected liquid crystal display panel 1.

The above-explained second exemplary embodiment also provides the same effects and advantages as the first exemplary embodiment.

In the second exemplary embodiment, since the comparison point of which absolute value of the difference in luminance value between the inspection point and the comparison point is minimum is defined as the defect emphasizing value, the bright and dark defects can be detected only by using the equations 17 to 24. Accordingly, the time required for the process is reduced as compared with the first exemplary embodiment in which the defect emphasizing value for the bright defect are calculated using equations 1 to 8 and the defect emphasizing value for the dark defect are calculated using equations 9 to 16.

Figure 10:
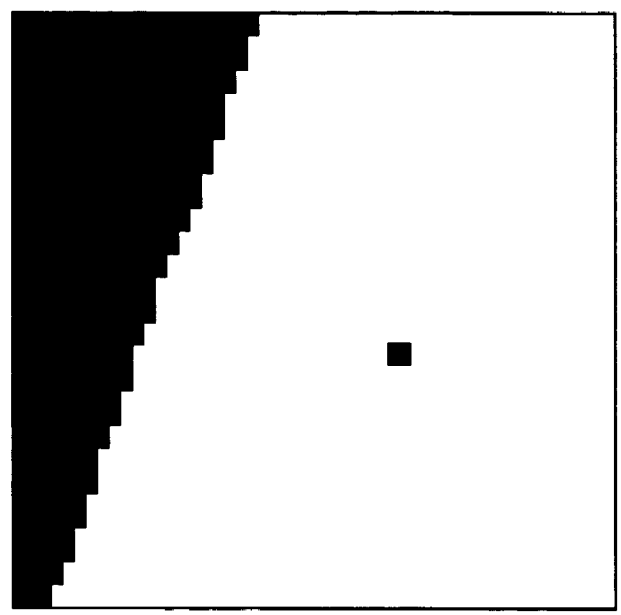
FIG. 10 shows an example of defects detected using the first exemplary embodiment and a second exemplary embodiment.
Figure 11:
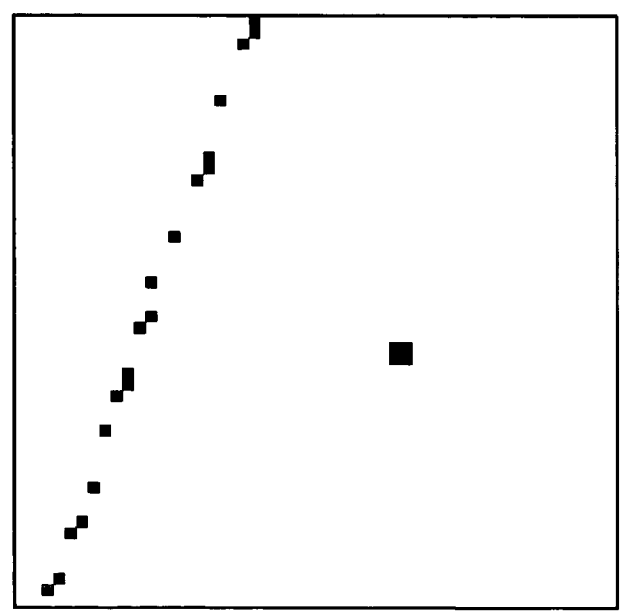
FIG. 11 shows a result of a detection that is conducted using the second exemplary embodiment on the defections shown in FIG. 10.
Figure 12:
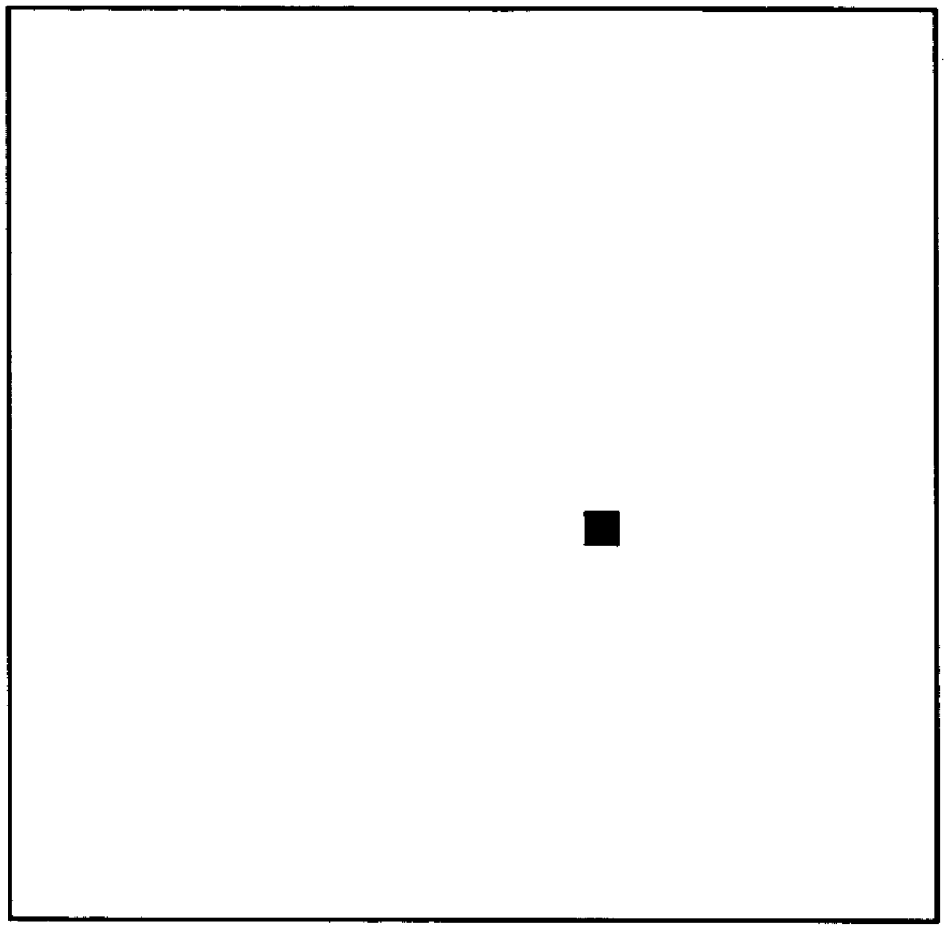
FIG. 12 shows a result of a detection that is conducted using the first exemplary embodiment on the defects shown in FIG. 10.

However, in a case where a boundary portion of a pattern in a digital image is unclear as shown in FIG. 10, using the method in which the minimum value is selected in terms of the absolute value like the second exemplary embodiment may cause a detection error in the boundary portion as shown in FIG. 11. In contrast, when the defect is evaluated by obtaining each defect emphasizing value for the bright and dark defects like the first exemplary embodiment, no detection error is generated in the boundary potion of the pattern as shown in FIG. 12 and only the detection portion can be accurately detected.

It should be noted that the invention is not limited to the first and second exemplary embodiments.

For example, in the first and second exemplary embodiments, the defect emphasizing value calculating process ST32 is conducted by using the different distances between the inspection point O and the comparison points S1 to S8 in order to process defects of a variety of sizes. However, the distance between the inspection point O and the comparison points S1 to S8 may not be changed depending on the size of the inspected defect. The process may be conducted only for one size.

Figure 13:
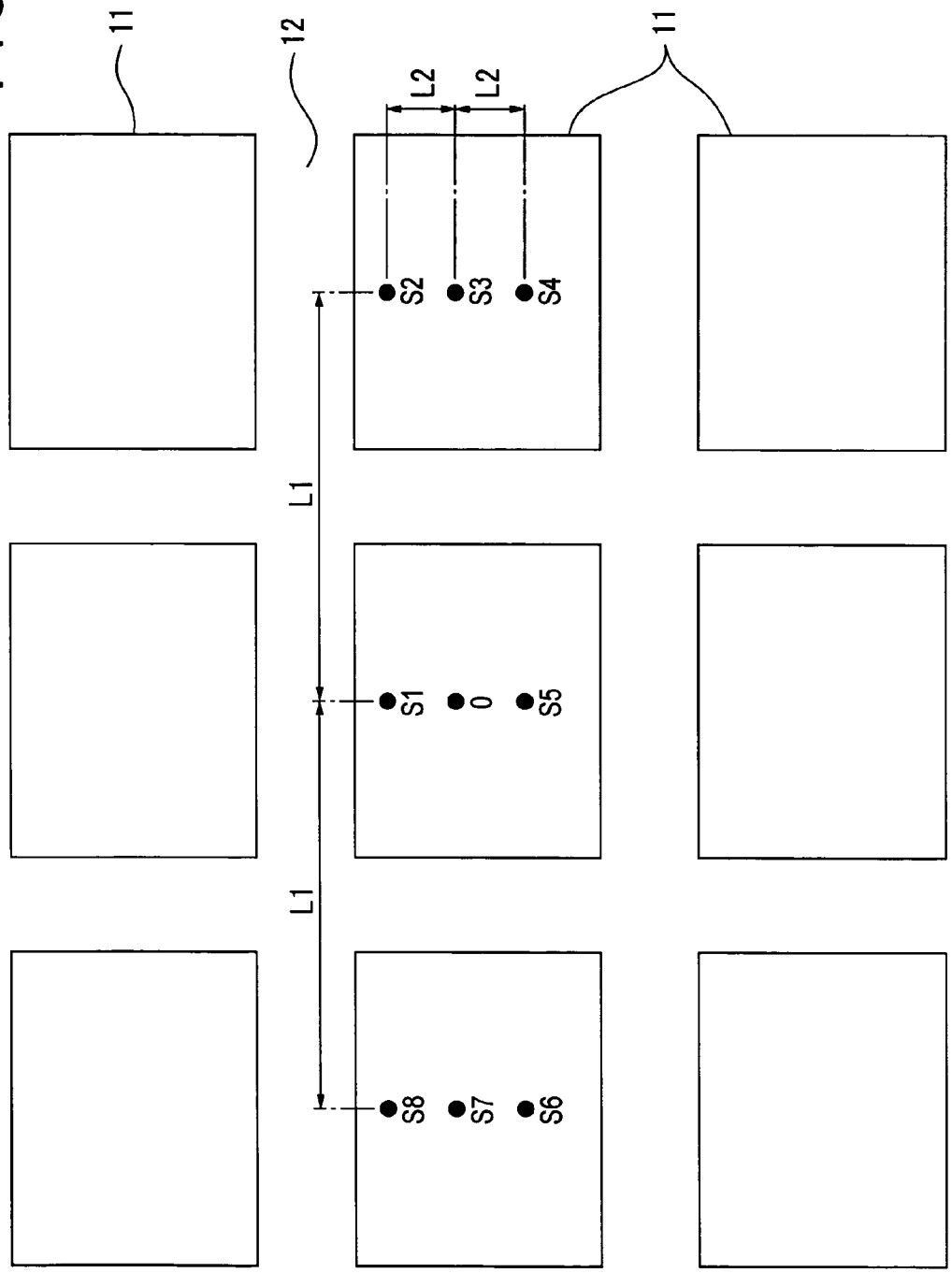
FIG. 13 shows a modification of the allocation of the inspection point and the comparison points.

The comparison points S1 to S8 may not have a common horizontal pitch L1 and a common vertical pitch L2. As shown in FIG. 13, the horizontal pitch L1 and the vertical pitch L2 may be different from each other.

In the first and second exemplary embodiments, the pitch L1 between the inspection point O and the comparison point S3 on the right side thereof and the pitch L1 between the inspection point O and the comparison point S7 on the left thereof are the same, but they may be different. Similarly, the pitch L2 between the inspection point O and the comparison point S1 on the upper side thereof and the pitch L2 between the inspection point O and the comparison point S5 on the lower side thereof may be different from each other.

The comparison points S1 to S8 are disposed in a lattice like manner in the aforesaid exemplary embodiments. However, the comparison points S2, S4, S6 and S8 may be disposed so as to have the same distance from the inspection point O as that of the comparison points S1, S3, S5 and S7. In other words, the comparison points S1 to S8 may be disposed on the circumference of a circle around the inspection point O.

The number of the comparison points is not limited to eight but may be set in accordance with the pattern of the inspection object and the size and shape of a defect to be detected. For example, when the black matrices 12 are disposed in a lattice like manner to dispose the TFT pixels 11 therebetween like the first and second exemplary embodiments, at least the four comparison points S1, S5, S3 and S7 respectively on the top, bottom, right and left of the inspection point O may be provided.

That is to say, it is only necessary to define an area by the comparison points, since the invention relates to a process for detecting a defect inside the area enclosed by the comparison points. Hence, it is necessary to provide at least four comparison points so as to enclose the inspection point O, but the number may be six, eight or nine or more.

In the first exemplary embodiment, the defect emphasizing value calculator 612 calculates the defect emphasizing value for the bright defect with equations 1 to 8 and the defect emphasizing value for the dark defect is calculated with equations 9 to 16. However, when only one of the bright and dark defects is to be detected, it is only necessary to calculate the defect emphasizing value corresponding to the one and to extract the defected region by applying only one of the thresholds for the bright and dark defects in the defect extractor 63 to the calculated defect emphasizing value.

In the second exemplary embodiment, the threshold values for the bright and dark defects are set, so that both of the bright and dark defects can be detected. However, only one of the bright and dark defects may be detected. For example, when it is only necessary to detect the bright defect, the comparison process with the threshold value for the dark defect may not be conducted in the detection.

In the first and second exemplary embodiments, the light source 2 is disposed on the other side of the CCD camera 5 with the liquid crystal display panel 1 interposed. However, the light source 2 may be disposed on the CCD camera 5 side as an epi-illumination. In the first and second exemplary embodiments, the CCD camera 5 is used for capturing the liquid crystal display panel 1. However, the display image of the liquid crystal display panel 1 may be projected on the screen like a projector such that the CCD camera 5 can capture the projected image.

The noise removing process ST4 by the noise remover 62 may not be conducted with the median filter (3×3) but may employ another known noise removing process.

In the first and second exemplary embodiments, the defect rank is judged based on the planar dimension and the like of the defect portion by the defect judging device 64. However, the rank may be judged by using another method or procedure. In other words, it is only necessary that the defect judging device 64 can judge based on the defect candidate emphasized by the defect emphasizing processor 61 whether or not the emphasized defect is a relevant defect to be detected.

In the first and second exemplary embodiments, when the distance between the inspection point O and the comparison points S1 to S8 is changed, the results are collectively processed for the judgment. However, whether or not each result represents the defect to be detected may be judged individually in each defect emphasizing process. Still, the defect can be effectively detected, when the judgment is made based on the selected result.

An object to be inspected for a defect is not limited to the liquid crystal display panel 1 using a TFT element. The invention may be used for inspecting displays such as liquid crystal display panels using other diode elements, plasma displays, EL displays and display units and products using the same. It is obvious that these usage examples mentioned above are included in the scoop of the invention.

In addition, an application example of the invention is not limited to the inspection of a variety of display units. The invention may be applied to a defect inspection of surface coatings of a variety of products, printing, wiring and the like, since, for example, a defect in a wiring pattern or a printing pattern can be detected by capturing the image thereof that includes the defect.

The invention may be used for detecting luminance blur defects and color blur defects, since a defect having a different luminance as compared with the surrounding portion in a captured image of a measured object, in which a brighter portion and a darker portion (portions having different luminance) are arranged in an identical sequence of pattern, can be detected.

What is claimed is:

1. A defect detecting device, comprising:
an image acquiring device for capturing an image of an inspection object having an identical pattern sequence and acquiring the image; and
a defect emphasizing device for emphasizing a defect of the captured image, wherein
the defect emphasizing device includes:
an inspected-point selecting device for sequentially selecting an inspection point in the captured image; and
a defect emphasizing value calculator for:
obtaining differences by subtracting from a luminance value of the selected inspection point each luminance value of a plurality of comparison points disposed around the inspection point in predetermined directions relative to the inspection point in order to define one difference of the smallest value of the obtained differences in luminance as a bright defect emphasizing value; and
obtaining differences by subtracting the luminance value of the selected inspection point from each luminance value of the plurality of comparison points disposed around the inspection point in order to define one difference of the smallest value of the obtained differences in luminance as a dark defect emphasizing value, and
wherein the defect of the captured image is emphasized by the defect emphasizing device by:
selecting the inspection point and a first set of the comparison points that are located at a predetermined distance relative to the inspection point;
calculating a first defect emphasizing value of the inspection point based on the first set of the comparison points;
changing a distance from the inspection point to the first set of the comparison pointes in the predetermined directions to obtain a second set of the comparison points;
calculating a second defect emphasizing value of the inspection point based on the second set of the comparison points; and
selecting a maximum one of the defect emphasizing values among the obtained first and second defect emphasizing values as the defect emphasizing value of the inspection point that is output as a defect-emphasized result.

2. A defect detecting device, comprising:
an image acquiring device for capturing an image of an inspection object having an identical pattern sequence and acquiring the image; and
a defect emphasizing device for emphasizing a defect of the captured image, wherein
the defect emphasizing device includes:
an inspected-point selecting device for sequentially selecting an inspection point in the captured image; and
a defect emphasizing value calculator for obtaining differences between a luminance value of the selected inspection point and each luminance value of a plurality of comparison points disposed around the inspection point in predetermined directions relative to the inspection point and selecting one difference of the smallest absolute value of the obtained differences in luminance to determine a defect emphasizing value of the inspection point, and
wherein the defect of the captured image is emphasized by the defect emphasizing device by:
selecting the inspection point and a first set of the comparison points that are located at a predetermined distance relative to the inspection point;
calculating a first defect emphasizing value of the inspection point based on the first set of the comparison points;
changing a distance from the inspection point to the first set of the comparison points in the predetermined directions to obtain a second set of the comparison points;
calculating a second defect emphasizing value of the inspection point based on the second set of the comparison points; and
selecting a maximum one of the defect emphasizing values among the obtained first and second defect emphasizing values as the defect emphasizing value of the inspection point that is output as a defect-emphasized result.

3. The defect detecting device according to claim 1, further comprising:

a noise remover for removing a noise component by applying a median filter to a defect emphasizing result obtained by the defect emphasizing value calculator, a defect extractor for extracting a defect portion by comparing the defect emphasizing value of the defect emphasizing result from which the noise component has been removed by the noise remover with a predetermined threshold value, and a defect judging device for judging the defect by obtaining defect information including the planar dimension and the position of the defect portion extracted by the defect extractor.

4. The defect detecting device according to claim 2, further comprising:

a noise remover for removing a noise component by applying a median filter to a defect emphasizing result obtained by the defect emphasizing value calculator, a defect extractor for extracting a defect portion by comparing the defect emphasizing value of the defect emphasizing result from which the noise component has been removed by the noise remover with a predetermined threshold value, and a defect judging device for judging the defect by obtaining defect information including the planar dimension and the position of the defect portion extracted by the defect extractor.

* * * * *